United States Patent
AlBahrani et al.

(10) Patent No.: US 10,392,550 B2
(45) Date of Patent: Aug. 27, 2019

(54) SPACER FLUID COMPOSITIONS, METHODS, AND SYSTEMS FOR AQUEOUS BASED DRILLING MUD REMOVAL

(71) Applicant: Saudi Arabian Oil Company, Dhahran (SA)

(72) Inventors: Hussain AlBahrani, Qatif (SA); Abdullah Al-Yami, Dhahran (SA); Vikrant Wagle, Abqaiq (SA)

(73) Assignee: Saudi Arabian Oil Company, Dhahran (SA)

( * ) Notice: Subject to any disclaimer, the term of this patent is extended or adjusted under 35 U.S.C. 154(b) by 25 days.

(21) Appl. No.: 15/489,930

(22) Filed: Apr. 18, 2017

(65) Prior Publication Data
US 2018/0223167 A1    Aug. 9, 2018

Related U.S. Application Data

(60) Provisional application No. 62/454,189, filed on Feb. 3, 2017, provisional application No. 62/454,192, filed on Feb. 3, 2017.

(51) Int. Cl.
*C09K 8/04*        (2006.01)
*C09K 8/40*        (2006.01)
(Continued)

(52) U.S. Cl.
CPC ............ *C09K 8/20* (2013.01); *B01F 17/0021* (2013.01); *B01F 17/0042* (2013.01); *B01F 17/0092* (2013.01); *C04B 7/527* (2013.01); *C04B 14/06* (2013.01); *C04B 24/02* (2013.01); *C04B 24/026* (2013.01); *C04B 24/085* (2013.01); *C04B 28/02* (2013.01); *C04B 28/04* (2013.01); *C04B 28/08* (2013.01); *C04B 38/02* (2013.01); *C09K 8/032* (2013.01); *C09K 8/035* (2013.01); *C09K 8/04* (2013.01); *C09K 8/08* (2013.01); *C09K 8/22* (2013.01); *C09K 8/32* (2013.01); *C09K 8/36* (2013.01); *C09K 8/40* (2013.01); *C09K 8/424* (2013.01); *C09K 8/46* (2013.01); *C09K 8/467* (2013.01); *C09K 8/48* (2013.01); *C09K 8/487* (2013.01); *C09K 8/74* (2013.01); *C10M 105/18* (2013.01); *C10M 105/62* (2013.01); *C10M 107/34* (2013.01); *C10M 111/04* (2013.01); *C10M 173/00* (2013.01); *C10M 173/02* (2013.01); *E21B 21/00* (2013.01); *E21B 21/002* (2013.01); *E21B 21/003* (2013.01); *E21B 33/14* (2013.01); *E21B 43/25* (2013.01); *C04B 2103/40* (2013.01); *C04B 2103/46* (2013.01); *C04B 2111/00068* (2013.01); *C04B 2201/20* (2013.01); *C09K 2208/12* (2013.01); *C09K 2208/34* (2013.01); *C10M 2201/062* (2013.01); *C10M 2201/08* (2013.01); *C10M 2201/103* (2013.01); *C10M 2207/003* (2013.01); *C10M 2207/046* (2013.01); *C10M 2209/104* (2013.01); *C10M 2209/108* (2013.01); *C10M 2209/1045* (2013.01); *C10M 2215/042* (2013.01); *C10M 2215/08* (2013.01); *C10M 2215/265* (2013.01); *C10M 2215/28* (2013.01); *C10M 2217/044* (2013.01); *C10N 2220/021* (2013.01); *C10N 2220/022* (2013.01); *C10N 2220/032* (2013.01); *C10N 2230/06* (2013.01); *C10N 2240/401* (2013.01); *C10N 2250/022* (2013.01); *Y02W 30/92* (2015.05); *Y02W 30/94* (2015.05)

(58) Field of Classification Search
CPC . C09K 8/035; C09K 8/22; C09K 8/26; C09K 8/265; C09K 8/268; C09K 8/28; C09K 8/40; C09K 8/501; C09K 8/601; Y10S 507/928
See application file for complete search history.

(56) References Cited

U.S. PATENT DOCUMENTS 2,589,949 A    3/1952   Meadors
2,782,163 A    2/1957   Doyne et al.
(Continued)

FOREIGN PATENT DOCUMENTS

AU         5117264 A      5/1967
CA         2495811 A1     3/2004
(Continued)

OTHER PUBLICATIONS

Akkutlu et al., "Molecular Dynamics Simulation of Adsorpotion from Microemulsions and Surfactant Micellar Solutions at Solid-Liquid, Liquid-Liquid and Gas-Liquid Interfaces", Tech Connector World Innovation Conference & Expo, Jun. 15-18, 2014, Washington D.C.
Fraser, Greig, "Method for Determining the Bioconcentration Factor of Linear Alcohol Ethoxylates", SPE Offshore Europe Oil and Gas Conference and Exhibition, Aberdeen, GB, Sep. 8-11, 2009, Society of Petroleum Engineers.
(Continued)

*Primary Examiner* — Alqun Li
(74) *Attorney, Agent, or Firm* — Dinsmore & Shohl LLP

(57) ABSTRACT

Spacer fluids include an emulsion, a surfactant package, and at least one additive that modifies the rheology of the spacer fluid, the density of the spacer fluid, or both. The emulsion may include an aqueous external phase and a hydrocarbon-based internal phase. The surfactant package may include one or more surfactants. The surfactant package may also include a surfactant having the general structure R—$(OCH_2CH_2)_9$—OH, where R is a hydrocarbyl having 12 carbon atoms, 13 carbon atoms, or 14 carbon atoms. The spacer fluid may contain at least 4.25 pounds of R—$(OCH_2CH_2)_9$—OH per barrel of the spacer fluid.

14 Claims, No Drawings

(51) Int. Cl.

| | |
|---|---|
| *C09K 8/48* | (2006.01) |
| *C09K 8/03* | (2006.01) |
| *C09K 8/20* | (2006.01) |
| *E21B 21/00* | (2006.01) |
| *C09K 8/22* | (2006.01) |
| *C09K 8/74* | (2006.01) |
| *E21B 43/25* | (2006.01) |
| *B01F 17/00* | (2006.01) |
| *E21B 33/14* | (2006.01) |
| *C09K 8/035* | (2006.01) |
| *C09K 8/08* | (2006.01) |
| *C04B 24/02* | (2006.01) |
| *C04B 28/02* | (2006.01) |
| *C09K 8/42* | (2006.01) |
| *C04B 24/08* | (2006.01) |
| *C04B 28/04* | (2006.01) |
| *C09K 8/487* | (2006.01) |
| *C04B 7/52* | (2006.01) |
| *C04B 14/06* | (2006.01) |
| *C04B 38/02* | (2006.01) |
| *C09K 8/46* | (2006.01) |
| *C10M 105/18* | (2006.01) |
| *C10M 105/62* | (2006.01) |
| *C10M 107/34* | (2006.01) |
| *C10M 111/04* | (2006.01) |
| *C09K 8/467* | (2006.01) |
| *C04B 28/08* | (2006.01) |
| *C10M 173/00* | (2006.01) |
| *C09K 8/32* | (2006.01) |
| *C09K 8/36* | (2006.01) |
| *C10M 173/02* | (2006.01) |
| *C04B 103/40* | (2006.01) |
| *C04B 103/46* | (2006.01) |
| *C04B 111/00* | (2006.01) |

(56) References Cited

U.S. PATENT DOCUMENTS

| | | |
|---|---|---|
| 2,786,027 A | 3/1957 | Salathiel |
| 3,000,826 A | 9/1961 | Gililland |
| 3,044,959 A | 7/1962 | Martin et al. |
| 3,048,538 A | 8/1962 | Rosenberg et al. |
| 3,319,714 A | 5/1967 | Knox |
| 3,353,603 A | 11/1967 | Knight et al. |
| 3,720,610 A | 3/1973 | Erasmus |
| 3,816,351 A | 6/1974 | Lancz |
| 3,849,316 A | 11/1974 | Motley et al. |
| 3,953,337 A | 4/1976 | Walker et al. |
| 4,140,650 A | 2/1979 | Wilde |
| 4,141,843 A | 2/1979 | Watson |
| 4,172,800 A | 10/1979 | Walker |
| 4,217,231 A | 8/1980 | King |
| 4,280,943 A | 7/1981 | Bivens et al. |
| 4,519,923 A | 5/1985 | Hori et al. |
| 4,561,985 A | 12/1985 | Glass, Jr. |
| 4,588,032 A | 5/1986 | Weigand et al. |
| 4,626,362 A | 12/1986 | Dickert, Jr. et al. |
| 4,658,036 A | 4/1987 | Schilling |
| 4,687,516 A | 8/1987 | Burkhalter et al. |
| 4,704,214 A | 11/1987 | Russell et al. |
| 4,719,021 A | 1/1988 | Branch, III |
| 4,842,065 A | 6/1989 | McClure |
| 5,007,489 A | 4/1991 | Enright et al. |
| 5,016,711 A | 5/1991 | Cowan |
| 5,105,885 A | 4/1992 | Bray et al. |
| 5,109,042 A | 4/1992 | Stephens |
| 5,275,654 A | 1/1994 | Cowan |
| 5,298,070 A | 3/1994 | Cowan |
| 5,314,022 A | 5/1994 | Cowan et al. |
| 5,330,662 A | 7/1994 | Jahnke et al. |
| 5,348,993 A | 9/1994 | Daeumer et al. |
| 5,399,548 A | 3/1995 | Patel |
| 5,474,701 A | 12/1995 | Jaquess et al. |
| RE35,163 E | 2/1996 | Christensen et al. |
| 5,586,608 A | 12/1996 | Clark et al. |
| 5,593,953 A | 1/1997 | Malchow, Jr. |
| 5,593,954 A | 1/1997 | Malchow |
| 5,602,082 A | 2/1997 | Hale et al. |
| 5,618,780 A | 4/1997 | Argillier et al. |
| 5,728,210 A | 3/1998 | Moran et al. |
| 5,744,432 A | 4/1998 | Bamhorst et al. |
| 5,850,880 A | 12/1998 | Moran et al. |
| 5,996,693 A | 12/1999 | Heathman |
| 6,063,737 A | 5/2000 | Haberman et al. |
| H1932 H | 1/2001 | Heathman et al. |
| 6,258,756 B1 | 7/2001 | Hayatdavoudi |
| 6,632,779 B1 | 10/2003 | Vollmer et al. |
| 6,803,346 B1 | 10/2004 | Bailey et al. |
| 6,972,274 B1 | 12/2005 | Slikta et al. |
| 6,974,852 B2 | 12/2005 | Stanger et al. |
| 7,081,438 B2 | 7/2006 | Horton |
| 7,262,152 B2 | 8/2007 | Monfreux-Gaillard et al. |
| 7,318,477 B2 | 1/2008 | Hou |
| 7,435,706 B2 | 10/2008 | Mueller et al. |
| 7,799,742 B2 | 9/2010 | Dino |
| 7,893,010 B2 | 2/2011 | Ali et al. |
| 8,252,728 B2 | 8/2012 | Karagianni et al. |
| 8,403,051 B2 | 3/2013 | Huang et al. |
| 8,563,479 B2 | 10/2013 | Amanullah et al. |
| 8,703,658 B2 | 4/2014 | Smith |
| 8,741,989 B2 | 6/2014 | Martin et al. |
| 8,932,997 B2 | 1/2015 | Merli et al. |
| 8,936,111 B2 | 1/2015 | Maghrabi et al. |
| 9,006,151 B2 | 4/2015 | Amanullah et al. |
| 9,034,800 B2 | 5/2015 | Harris et al. |
| 9,127,192 B2 | 9/2015 | Maghrabi et al. |
| 9,175,205 B2 | 11/2015 | Amanullah et al. |
| 2001/0027880 A1 | 10/2001 | Brookey |
| 2003/0017953 A1 | 1/2003 | Horton et al. |
| 2003/0127903 A1 | 7/2003 | Quintero |
| 2004/0108113 A1 | 6/2004 | Luke et al. |
| 2004/0144537 A1 | 7/2004 | Reddy et al. |
| 2005/0049147 A1 | 3/2005 | Patel et al. |
| 2006/0111245 A1 | 5/2006 | Carbajal et al. |
| 2006/0174805 A1 | 8/2006 | Chatterji et al. |
| 2006/0183842 A1 | 8/2006 | Johnson |
| 2006/0254770 A1 | 11/2006 | Hou |
| 2007/0015678 A1 | 1/2007 | Rodrigues et al. |
| 2007/0093393 A1 | 4/2007 | Navarrete et al. |
| 2008/0006404 A1 | 1/2008 | Reddy et al. |
| 2008/0194432 A1 | 4/2008 | Heidlas |
| 2008/0171671 A1 | 7/2008 | Mueller et al. |
| 2008/0217064 A1 | 9/2008 | Stoian et al. |
| 2008/0308011 A1 | 12/2008 | Brothers et al. |
| 2009/0042746 A1 | 2/2009 | Bailey |
| 2009/0200033 A1 | 8/2009 | Kakadjian et al. |
| 2010/0016180 A1 | 1/2010 | Scoggins et al. |
| 2010/0152067 A1 | 6/2010 | McDonald |
| 2010/0152068 A1 | 6/2010 | Hartshorne et al. |
| 2010/0263863 A1* | 10/2010 | Quintero ............ C09K 8/40 166/267 |
| 2010/0319915 A1 | 12/2010 | Bustos et al. |
| 2010/0326660 A1 | 12/2010 | Ballard et al. |
| 2011/0306524 A1 | 12/2011 | Smith |
| 2012/0018226 A1 | 1/2012 | Nzeadibe et al. |
| 2012/0241155 A1 | 9/2012 | Ali et al. |
| 2012/0329683 A1 | 12/2012 | Droger et al. |
| 2013/0079256 A1 | 3/2013 | Yang et al. |
| 2013/0092376 A1 | 4/2013 | Al-Subhi et al. |
| 2013/0153232 A1 | 6/2013 | Bobier et al. |
| 2013/0244913 A1 | 9/2013 | Maberry et al. |
| 2013/0303410 A1 | 11/2013 | Wagle et al. |
| 2013/0303411 A1 | 11/2013 | Wagle et al. |
| 2014/0024560 A1 | 1/2014 | Gonzalez Poche et al. |
| 2014/0024561 A1 | 1/2014 | Reddy |
| 2014/0073540 A1 | 3/2014 | Berry et al. |
| 2014/0102809 A1 | 4/2014 | King et al. |
| 2014/0121135 A1 | 5/2014 | Gamage et al. |

(56) References Cited

U.S. PATENT DOCUMENTS

| | | |
|---|---|---|
| 2014/0213489 A1 | 7/2014 | Smith |
| 2014/0318785 A1 | 10/2014 | Reddy et al. |
| 2014/0332212 A1 | 11/2014 | Ayers et al. |
| 2015/0024975 A1 | 1/2015 | Wagle et al. |
| 2015/0034389 A1 | 2/2015 | Perez |
| 2015/0080273 A1 | 3/2015 | Hatchman et al. |
| 2015/0087563 A1 | 3/2015 | Brege et al. |
| 2015/0159073 A1 | 6/2015 | Assmann et al. |
| 2015/0240142 A1 | 8/2015 | Kefi et al. |
| 2015/0299552 A1 | 10/2015 | Zamora et al. |
| 2016/0009981 A1 | 1/2016 | Teklu et al. |
| 2016/0024370 A1 | 1/2016 | Ba geri et al. |
| 2016/0069159 A1 | 3/2016 | Teklu et al. |
| 2016/0177169 A1 | 6/2016 | Zhang |
| 2016/0186032 A1 | 6/2016 | Yu et al. |
| 2016/0237340 A1 | 8/2016 | Pandya et al. |
| 2016/0289529 A1 | 10/2016 | Nguyen |
| 2017/0009125 A1 | 1/2017 | Shaffer et al. |
| 2018/0223162 A1 | 8/2018 | Al-Yami et al. |

FOREIGN PATENT DOCUMENTS

| | | |
|---|---|---|
| CA | 2594108 A1 | 9/2008 |
| CA | 2810345 A1 | 3/2012 |
| CA | 2745017 A1 | 12/2012 |
| CN | 102120158 A | 7/2011 |
| CN | 101240218 B | 12/2011 |
| CN | 102041138 B | 12/2011 |
| CN | 102321461 A | 1/2012 |
| CN | 102382697 A | 3/2012 |
| CN | 102373042 B | 8/2013 |
| CN | 102464974 B | 8/2013 |
| CN | 103320203 A | 9/2013 |
| CN | 102500141 B | 1/2014 |
| CN | 103571599 A | 2/2014 |
| CN | 102899152 B | 4/2014 |
| CN | 102899154 B | 4/2014 |
| CN | 102977940 B | 11/2014 |
| CN | 104130839 A | 11/2014 |
| CN | 104559954 A | 4/2015 |
| CN | 103351925 B | 7/2015 |
| CN | 102373053 B | 8/2015 |
| CN | 103571578 B | 8/2015 |
| CN | 104830513 A | 8/2015 |
| CN | 104877749 A | 9/2015 |
| CN | 104910881 A | 9/2015 |
| CN | 105038737 A | 11/2015 |
| CN | 103757640 B | 12/2015 |
| CN | 105112036 A | 12/2015 |
| CN | 103773041 B | 1/2016 |
| CN | 105441051 A | 3/2016 |
| CN | 104449893 B | 5/2016 |
| CN | 103555304 B | 6/2016 |
| CN | 105623814 A | 6/2016 |
| CN | 105778992 A | 7/2016 |
| CN | 105861135 A | 8/2016 |
| EP | 0108546 A2 | 5/1984 |
| EP | 0243067 A2 | 10/1987 |
| EP | 0265563 A1 | 5/1988 |
| EP | 0296655 A1 | 12/1988 |
| EP | 315243 A1 | 5/1989 |
| EP | 331158 A2 | 9/1989 |
| EP | 0 395 815 A1 | 11/1990 |
| EP | 1213270 B1 | 2/2005 |
| EP | 2708586 A1 | 3/2014 |
| GB | 2205748 A | 12/1988 |
| GB | 2283036 A | 4/1995 |
| GB | 2 343 447 A | 5/2000 |
| JP | 07109472 A | 4/1995 |
| WO | 8911516 A1 | 11/1989 |
| WO | 9402565 A1 | 2/1994 |
| WO | 9530818 A1 | 11/1995 |
| WO | 9640836 A1 | 12/1996 |
| WO | 9730142 A1 | 8/1997 |
| WO | 98/36151 | 8/1998 |
| WO | 9907816 A1 | 2/1999 |
| WO | 01/23703 A1 | 4/2001 |
| WO | 03093641 A1 | 11/2003 |
| WO | 2004/076561 A1 | 9/2004 |
| WO | 2006012622 A2 | 2/2006 |
| WO | 2006/120151 A2 | 11/2006 |
| WO | 2007003885 A2 | 1/2007 |
| WO | 2007/118328 A1 | 10/2007 |
| WO | 2008081158 A2 | 7/2008 |
| WO | 2009060405 A1 | 5/2009 |
| WO | 2009138383 A1 | 11/2009 |
| WO | 2010/030275 A1 | 3/2010 |
| WO | 2012101594 A1 | 8/2012 |
| WO | 2012158645 A1 | 11/2012 |
| WO | 2013055843 A1 | 4/2013 |
| WO | 2013154435 A1 | 10/2013 |
| WO | 2014107391 A1 | 7/2014 |
| WO | 2014164381 A1 | 10/2014 |
| WO | 2014193507 A1 | 12/2014 |
| WO | 2015000077 A1 | 1/2015 |
| WO | 2015006101 A1 | 1/2015 |
| WO | 2015041649 A1 | 3/2015 |
| WO | 2016/189062 A1 | 12/2016 |
| WO | 2015/038117 A1 | 3/2018 |

OTHER PUBLICATIONS

Inoue et al., "Interactions Between Engine Oil Additive", J. Japan Petrol. Inst., 1981, 24 (2), 101-107.

Joshi et al., "Physiochemical Behaviour of Ternary System Based on Coconut Oil/C12/E8/n-pentanol/Water", J. Surface Sci. Technol., 2013, 29 (1-2), 1-13.

Lim, Jongchoo, "Solubilization of Mixture of Hydrocarbon Oils by C12e 8 Nonionic Surfactant Solution", Journal of the Korean Industrial and Engineering Chemistry, 2008, 19, 59-65.

Luan et al., "Foaming Property for Anionic-Nonionic Gemini Surfactant of Polyalkoxylated Ether Sulfonate", Oilfield Chemistry, Tsinghua Tongfang Knowledge Network Technology Co., Ltd., 2006.

Min et al., "Research on Coking Dust Wettability of Strong Cohesiveness and Easy Mudding", Safety in Coal Mines, Tsinghua Tongfang Knowledge Network Technology Co., Ltd., 2006.

Mitchell et al., "Measurement of HTHP Fluid-Loss Equipment and Test Fluids with Thermocouples", American Association of Drilling Engineers, AADE Drilling Fluids Conference, Houston TX, Apr. 6-7, 2004.

Nelson, Erik B., "Well Cementing Fundamentals", Oilfield Review, Summer 2012, vol. 24, No. 2, 59-60, Schlumberger.

Paswan et al., "Development of Jatropha oil-in-water emulsion drilling mud system", Journal of Petroleum Science and Engineering, 2016, vol. 144, p. 10-18.

Sun et al., "Synthesis and Salt Tolerance Determination of Aliphatic Alcohol Polyoxyethylene Ethers Sulfonate Series", Journal of Chemical Industry & Engineering, Tsinghua Tongfang Knowledge Network Technology Co., Ltd., 2006.

International Search Report and Written Opinion dated Apr. 3, 2018, pertaining to International Application PCT/US2018/016447, filed Feb. 1, 2018, 14 pages.

International Search Report and Written Opinion issued Apr. 20, 2018, pertaining to International Application PCT/US2018/016365, filed Feb. 1, 2018, 16 pages.

International Search Report and Written Opinion dated Apr. 20, 2018, pertaining to International Application PCT/US2018/016414, filed Feb. 1, 2018, 14 pages.

International Search Report and Written Opinion dated Apr. 16, 2018, pertaining to International Application PCT/US2018/016415, filed Feb. 1, 2018, 13 pages.

Non-Final Office Action dated Apr. 30, 2018 pertaining to U.S. Appl. No. 15/586,543, filed May 4, 2017.

Non-Final Office Action dated May 1, 2018 pertaining to U.S. Appl. No. 15/496,794, filed Apr. 25, 2017.

Shell Chemicals, HLB numbers, solvent miscibility and emulsification characteristics of NEODOL ethoxylates, retrieved Apr. 26, 2018 from https://www.shel.com/business-customers/chemicals/our-

(56) References Cited

OTHER PUBLICATIONS products/higher-olefins-and-derivatives/neodol-alchols-and-ethoxylates/_jcr_contents/par/tabbedcontent/tab_1780231844/textimage.
International Search Report pertaining to International Application No. PCT/US2018/014986, filed Jan. 24, 2018, 8 pages.
Written Opinion pertaining to International Application No. PCT/US2018/014986, filed Jan. 24, 2018, 12 pages.
International Search Report and Written Opinion dated Apr. 3, 2018 for PCT/US2018/016182 Filed Jan. 31, 2018. pp. 1-13.
Non-Final Office Action dated May 4, 2018 pertaining to U.S. Appl. No. 15/628,892, filed Jun. 21, 2017.
International Search Report and Written Opinion dated May 8, 2018 pertaining to International Application No. PCT/US2018/015631.
International Search Report and Written Opinion dated May 14, 2018 pertaining to International Application No. PCT/US2018/015640 filed Jan. 29, 2018, 16 pages.
International Search Report and Written Opinion dated May 9, 2018 pertaining to International Application No. PCT/US2018/015638 filed Jan. 29, 2018, 15 pages.
Non-Final Office Action dated May 25, 2018 pertaining to U.S. Appl. No. 15/485,724, 6 pages.
Office Action pertaining to U.S. Appl. No. 16/002,672 dated Sep. 14, 2018.
Office Action pertaining to. U.S. Appl. No. 16/002,669 dated Sep. 21, 2018.
Final Rejection dated Oct. 9, 2018 pertaining to U.S. Appl. No. 15/496,794.
Sabicol Ta Series Synthetic Alcohol Ethoxylates, SGS, 2013, pp 1-3, retrieved Sep. 28, 2018 from http://www.latra.com.tr/upload/1499842623-t2.pdf (Year:2013).
International Search Report and Written Opinion dated May 25, 2018, pertaining to International Application No. PCT/US2018/016167, filed Jan. 31, 2018, 20 pages.
International Search Report and Written Opinion dated May 29, 2018 pertaining to International Application No. PCT/US2018/015207 filed Jan. 25, 2018, 15 pages.
Office Action pertaining to U.S. Appl. No. 15/489,927 dated Jul. 6, 2018.
Non-Final Office Action dated Jan. 16, 2018 pertaining to U.S. Appl. No. 15/485,479, filed Apr. 12, 2017.
International Search Report pertaining to International Application No. PCT/US2018/015191, filed Jan. 25, 2018, 6 pages.
Written Opinion pertaining to International Application No. PCT/US2018/015191, filed Jan. 25, 2018, 8 pages.
International Search Report and Written Opinion dated Mar. 16, 2018 pertaining to International Application No. PCT/US2018/015140.
Office Action dated Dec. 12, 2018 pertaining to U.S. Appl. No. 15/581,136, filed Apr. 28, 2017.
Notice of Allowance and Fee(s) Due dated Jan. 8, 2019 pertaining to U.S. Appl. No. 15/485,479, filed Apr. 12, 2017.
Office Action dated Jan. 17, 2019 pertaining to U.S. Appl. No. 15/485,724, filed Apr. 12, 2017.
Office Action dated Feb. 11, 2019 pertaining to U.S. Appl. No. 15/496,794, filed Apr. 25, 2017, 16 pgs.
Office Action dated Feb. 11, 2019 pertaining to U.S. Appl. No. 15/920,879, filed Mar. 14, 2018, 58 pgs.
Office Action dated Feb. 7, 2019 pertaining to U.S. Appl. No. 16/002,669, filed Jun. 7, 2018, 54 pgs.
Office Action dated Feb. 21, 2019 pertaining to U.S. Appl. No. 16/037,493, filed Jul. 17, 2018, 52 pgs.
Office Action dated Jan. 24, 2019 pertaining to U.S. Appl. No. 15/489,854, filed Apr. 18, 2017, 46 pgs.
Office Action dated Feb. 5, 2019 pertaining to U.S. Appl. No. 15/612,397, filed Jun. 2, 2017, 67 pgs.
Office Action dated Feb. 27, 2019 pertaining to U.S. Appl. No. 15/922,077, filed Mar. 15, 2018, 69 pgs.
Notice of Allowance and Fee(s) Due dated Feb. 21, 2019 pertaining to U.S. Appl. No. 15/489,927, filed Apr. 18, 2017, 27 pgs.
Office Action dated Mar. 13, 2019 pertaining to U.S. Appl. No. 15/922,065, filed Mar. 15, 2018, 77 pgs.
Office Action dated Mar. 27, 2019 pertaining to U.S. Appl. No. 15/581,136, filed Apr. 28, 2017, 20 pgs.
Office Action dated Apr. 4, 2019 pertaining to U.S. Appl. No. 15/586,543, filed May 4, 2017, 23 pgs.
Office Action dated Apr. 8, 2019 pertaining to U.S. Appl. No. 15/660,118, filed Jul. 26, 2017, 76 pgs.
U.S. Office Action dated Apr. 11, 2019 pertaining to U.S. Appl. No. 15/628,892, filed Jun. 21, 2017, 34 pgs.
U.S. Notice of Allowance dated Apr. 24, 2019 pertaining to U.S. Appl. No. 15/485,724 filed Apr. 12, 2017, 23 pgs.
Notice of Allowance and Fee(s) Due dated May 15, 2019 pertaining to U.S. Appl. No. 15/922,077, filed Mar. 15, 2018, 27 pgs.
Office Action dated Jun. 10, 2019 pertaining to U.S. Appl. No. 15/920,879, filed Mar. 14, 2018, 29 pgs.
Office Action dated Jun. 12, 2019 pertaining to U.S. Appl. No. 16/002,669, filed Jun. 7, 2018, 33 pgs.
Office Action dated Jun. 14, 2019 pertaining to U.S. Appl. No. 15/489,854, filed Apr. 18, 2017, 20 pgs.
Office Action dated Jun. 24, 2019 pertaining to U.S. Appl. No. 16/037,493, filed Jul. 17, 2018, 31 pgs.

\* cited by examiner

SPACER FLUID COMPOSITIONS, METHODS, AND SYSTEMS FOR AQUEOUS BASED DRILLING MUD REMOVAL

CROSS REFERENCES TO RELATED APPLICATIONS

This application claims priority to U.S. Provisional Patent Application Ser. No. 62/454,189 filed Feb. 3, 2017, and to U.S. Provisional Patent Application Ser. No. 62/454,192 filed Feb. 3, 2017, both of which are incorporated by reference in their entirety.

TECHNICAL FIELD

Embodiments of the present disclosure generally relate to spacer fluid compositions, methods, and systems used for removing aqueous based drilling muds from wellbores and subterranean hydrocarbon bearing formations.

BACKGROUND

During drilling operations, drilling fluids, which may also be referred to as drilling muds, are circulated through the wellbore to cool the drill bit and maintain the wellbore. Also during drilling operations, a cement slurry may be introduced into the wellbore to secure the structure of the wellbore. Drilling muds may be either aqueous or hydrocarbon-based and vary in composition.

Under some conditions, the presence of drilling muds in the wellbore negatively affects the performance of the cement slurry. In these conditions, it is sometimes desirable to pass a spacer fluid through the wellbore.

SUMMARY

Wellbores are commonly cemented by filling an annulus between the tubular and the wellbore wall with a cement slurry. Prior to being cemented, the wellbore may be filled with a drilling fluid, also known as a drilling mud. The presence of the drilling mud may negatively affect the performance of the cement slurry. A spacer fluid may be added into the wellbore to remove the drilling fluid from the wellbore prior to the addition of the cement slurry. Accordingly, there is a need for spacer fluids, methods, and systems for the displacement of aqueous muds. The present embodiments address this need by providing spacer fluids, methods of using spacer fluids to displace aqueous muds, and wellbore fluid systems comprising a spacer fluid and an aqueous mud disposed in a wellbore.

The presently disclosed spacer fluids typically include at least an emulsion, a surfactant package, and at least one additive that modifies the rheology of the spacer fluid, the density of the spacer fluid, or both. In some embodiments, one role of the surfactant package in the spacer fluids is to improve mud removal efficiency of the spacer fluid. The spacer fluids according to embodiments include a surfactant package that includes an ethoxylated alcohol surfactant having the formula R—(OCH$_2$CH$_2$)$_9$—OH, where R is a hydrocarbyl having from 12 to 14 carbon atoms. The ethoxylated alcohol surfactant may improve mud removal efficiency of the spacer fluid.

In one embodiment, a spacer fluid comprises an emulsion, a surfactant package, and at least one additive that modifies the rheology of the spacer fluid, the density of the spacer fluid, or both. The emulsion may comprise an aqueous external phase and a hydrocarbon-based internal phase. The surfactant package may comprise one or more surfactants. The surfactant package may also comprise a surfactant having the general chemical structure R—(OCH$_2$CH$_2$)$_9$—OH. In one embodiment, R is a hydrocarbyl having 12 carbon atoms and the surfactant R—(OCH$_2$CH$_2$)$_9$—OH is present in a concentration of at least 4.25 pounds per barrel of spacer fluid (where 1 pound equals 0.454 kilograms and 1 barrel is equivalent to 159 liters). In other embodiments, R may be a hydrocarbyl having 13 or 14 carbon atoms.

In another embodiment, a method of removing aqueous muds from a wellbore comprises adding a spacer fluid to a wellbore comprising an aqueous mud, passing the spacer fluid through the wellbore, and at least a portion of the aqueous mud exits the wellbore through a conduit defined by an exterior wall of the tubular and a wall of the wellbore. The spacer fluid may comprise an emulsion, a surfactant package, and at least one additive that modifies the rheology of the spacer fluid, the density of the spacer fluid, or both.

In yet another embodiment, a wellbore fluid system comprises an aqueous mud and a spacer fluid both disposed in a wellbore. The aqueous mud and the spacer fluid may both have a density and a yield point measured by American Petroleum Institute Recommended Practice 13B-1. The spacer fluid may comprise an emulsion, a surfactant package, and at least one additive that modifies the rheology of the spacer fluid, the density of the spacer fluid, or both. The density of the spacer fluid is 5% to 20% greater than the density of the aqueous mud and the difference of the yield point of the aqueous mud and the yield point of the spacer fluid may be less than or equal to 15 lbs/100 ft$^2$.

Additional features and advantages of the described embodiments will be set forth in the detailed description which follows, and in part will be readily apparent to those skilled in the art from that description or recognized by practicing the described embodiments, including the detailed description which follows as well as the claims.

DETAILED DESCRIPTION

Embodiments of the present application are directed to a spacer fluid composition, in particular, a spacer fluid composition that is rheologically compatible with an aqueous drilling mud. The spacer fluid may comprise an emulsion, a surfactant package in the emulsion, and at least one additive. The emulsion may comprise an aqueous external phase and a hydrocarbon-based internal phase. The surfactant package may comprise one or more surfactants, which may comprise an ethoxylated alcohol surfactant according to Formula (I):

$$R—(OC_2H_4)_9—OH \qquad (I)$$

where R is a hydrocarbyl having from 12 to 14 carbon atoms. A surfactant of Formula (I) of the surfactant package may have a hydrophilic-lipophilic balance (HLB) from 11 to 15. The one or more additives may modify the viscosity of the spacer fluid, the density of the spacer fluid, or both.

Other embodiments of the present application relate to methods for removing aqueous based drilling muds from a wellbore. The method may comprise passing a spacer fluid through the wellbore. The wellbore may comprise an annulus, an exterior, an outlet disposed at the surface of the wellbore, and at least one aqueous mud. The spacer fluid may comprise an emulsion, a surfactant package in the emulsion, and at least one additive. The emulsion may comprise an aqueous external phase and a hydrocarbon-based internal phase. The surfactant package may comprise an ethoxylated alcohol surfactant according to formula (I) where R is a hydrocarbyl having from 12 to 14 carbon atoms. The surfactant package may have an HLB value from 11 to 15. The spacer fluid additive or additives may modify the viscosity of the spacer fluid, the density of the spacer fluid, or both. The passing spacer fluid may be directed through the annulus and out the outlet of the wellbore. The spacer fluid may then direct the aqueous mud in the wellbore to flow through the annulus and out the outlet of the wellbore.

Still other embodiments of the present application relate to a wellbore fluid system comprising an aqueous mud and a spacer fluid both disposed in a wellbore. The spacer fluid may comprise an emulsion, a surfactant package comprising one or more surfactants in the emulsion, and at least one additive. The emulsion may comprise an aqueous external phase and a hydrocarbon-based internal phase. The surfactant package may comprise an ethoxylated alcohol surfactant according to formula (I) where R is a hydrocarbyl having from 12 to 14 carbon atoms. The ethoxylated alcohol surfactant may have an HLB value from 11 to 15. The one or more additives may modify the viscosity of the spacer fluid, the density of the spacer fluid, or both. In some embodiments of the wellbore fluid system, the density of the spacer fluid is 5% to 20% greater than the density of the aqueous mud. In some embodiments of the wellbore fluid system, the difference between the yield point of the aqueous mud and the yield point of the spacer fluid may be less than 15 pounds per hundred square feet (lbs/100 ft$^2$).

A wellbore is a hole that extends from the surface to a location below the surface. The wellbore can permit access as a pathway between the surface and a hydrocarbon-bearing formation. The wellbore, defined and bound along its operative length by a wellbore wall, extends from a proximate end at the surface, through the subsurface, and into the hydrocarbon-bearing formation, where it terminates at a distal wellbore face. The wellbore forms a pathway capable of permitting both fluid and apparatus to traverse between the surface and the hydrocarbon-bearing formation.

Besides defining the void volume of the wellbore, the wellbore wall also acts as the interface through which fluid can transition between the interior of the wellbore and the formations through which the wellbore traverses. The wellbore wall can be unlined (that is, bare rock or formation) to permit such interaction with the formation or lined (that is, with casing, tubing, production liner or cement) so as to not permit such interactions.

The wellbore usually contains at least a portion of at least one fluid conduit that links the interior of the wellbore to the surface. Examples of such fluid conduits include casing, liners, pipes, tubes, coiled tubing and mechanical structures with interior voids. A fluid conduit connected to the surface is capable of permitting regulated fluid flow and access between equipment on the surface and the interior of the wellbore. Example equipment connected at the surface to the fluid conduit includes pipelines, tanks, pumps, compressors and flares. The fluid conduit is sometimes large enough to permit introduction and removal of mechanical devices, including tools, drill strings, sensors and instruments, into and out of the interior of the wellbore.

The fluid conduit made from a tubular usually has at least two openings (typically on opposing ends) with an enclosing surface having an interior and exterior surface. The interior surface acts to define the bounds of the fluid conduit. Examples of tubulars and portions of tubulars used in the wellbore as fluid conduits or for making or extending fluid conduits include casing, production liners, coiled tubing, pipe segments and pipe strings. An assembly of several smaller tubulars connected to one another, such as joined pipe segments or casing, can form a tubular that acts as a fluid conduit.

When positioning a tubular or a portion of tubular in the wellbore, the volume between the exterior surfaces of the fluid conduit or tubular portion and the wellbore wall of the wellbore forms and defines a wellbore annulus. The wellbore annulus has a volume in between the external surface of the tubular or fluid conduit and the wellbore wall.

During a drilling operation on a wellbore, drilling fluid, also known as drilling mud, fills the interior of the wellbore as the wellbore fluid. Some drilling muds are petroleum-based compositions and some are water-based compositions. Drilling muds that are water-based compositions are also known as aqueous muds. Aqueous muds usually comprise from 30 to 351 pounds of water per barrel of drilling mud, where a barrel is defined as 42 gallons or 159 liters. The remainder of aqueous muds may comprise minerals, additives that modify viscosity or density, weighting agents, salts, emulsifiers, or other materials.

During drilling operations on a wellbore, wellbore fluid circulates between the surface and the wellbore interior through fluid conduits. Wellbore fluid also circulates around the interior of the wellbore. The introduction of drilling fluid into the wellbore through a first fluid conduit at pressure induces the motivation for the fluid flow in the wellbore fluid. Displacing wellbore fluid through a second fluid conduit connected to the surface induces wellbore fluid circulation from the first fluid conduit to the second fluid conduit in the interior of the wellbore. The expected amount of wellbore fluid displaced and returned to the surface through the second fluid conduit is equivalent to the amount introduced into the wellbore through the first fluid conduit. Parts of the wellbore that are fluidly isolated do not support circulation.

Cementing is one of the most important operations in both drilling and completion of the wellbore. Primary cementing occurs at least once to secure a portion of the fluid conduit between the wellbore interior and the surface to the wellbore wall of the wellbore.

A variety of water-based cements slurries are available for primary cementing operations. Primary cements typically contain calcium, aluminum, silicon, oxygen, iron and sulfur compounds that react, set and harden upon the addition of water. The water used with the cement slurry can be fresh water or salt water and depend on the formation of the cement slurry and its tolerance to salts and free ions. Suitable water-based cements include Portland cements, pozzolana cements, gypsum cements, high alumina content cements, slag cements, silica cements, high alkalinity cements, latex and resin-based cements.

Primary cementing forms a protective solid sheath around the exterior surface of the introduced fluid conduit by positioning cement slurry in the wellbore annulus. Upon positioning the fluid conduit in a desirable location in the wellbore, introducing cement slurry into the wellbore fills at least a portion if not all of the wellbore annulus. When the cement slurry cures, the cement physically and chemically bonds with both the exterior surface of the fluid conduit and the wellbore wall, coupling the two. In addition, the solid cement provides a physical barrier that prohibits gases and liquids from migrating from one side of the solid cement to the other via the wellbore annulus. This fluid isolation does not permit fluid migration uphole of the solid cement through the wellbore annulus.

Displacing wellbore fluid for primary cementing operations is similar to establishing circulation in the wellbore fluid with a drilling mud. An amount of cement slurry introduced into the wellbore through a first fluid conduit induces fluid flow in the wellbore and displaces an equivalent amount of wellbore fluid to the surface through a second fluid conduit. In such an instance, the wellbore fluid includes a portion of the wellbore fluid previously contained in the wellbore before cement introduction as well as the amount of the introduced cement slurry.

Direct contact of the cement slurry with the drilling mud can result in detrimental fluid interactions that can jeopardize not only cementing operations but also the integrity of the wellbore. The intermingling of incompatible fluids can create emulsions between the fluids. The emulsions, which resist fluid movement upon the application of force, raise the viscosity profile of the wellbore fluid. Increasing pumping head pressure to maintain a constant fluid circulation rate in the wellbore can result in damaging the formation downhole as wellbore fluid pressure exceeds the fracture gradient of the formation.

Besides detrimentally affecting the viscosity profile, when solids and water from the cement slurry transfer into the drilling mud during emulsification, the properties of the drilling mud are detrimentally affected. Dilution, chemical interaction, breaking of a water-in-oil emulsion and flocculation of suspended additives out of the oil phase can also occur.

Cement slurry properties can also suffer from contamination by the drilling mud. Flocculation of weighting agents and macromolecules can cause the cement to have reduced compressive strength. The diffusion of ionic species from the drilling mud can cause premature setting of the cement slurry. The ramifications of early cement hardening include equipment damage, time delay, wellbore damage and possible loss of the entire tubular string. Contamination of the cement slurry with drilling mud results in higher slurry viscosity and higher fluid losses from the hardening slurry.

Without being bound by theory, it is believed that the spacer fluids presently disclosed may have a beneficial effect with respect to one or more of the problems with spacer cementing processes described. The spacer fluids of the present disclosure have a greater aqueous mud removal efficiency than that of previously known spacer fluids including surfactant packages that do not contain the ethoxylated alcohol surfactant according to Formula (I). Spacer fluids with greater mud removal efficiency can limit, decrease, or prevent the aqueous mud from interacting with the cement slurry and adversely affecting the cementing process.

As previously described in the present description, the spacer fluid may comprise one or more of an emulsion, a surfactant package, and at least one additive that modifies the rheology of the spacer fluid, the density of the spacer fluid, or both. It should be understood that while embodiments of spacer fluids presently described include these components, other components may be included in a spacer fluid for various functional reasons, and it is contemplated that additional components may be included in the spacer fluids presently described. As used in this disclosure, a "surfactant package" refers to the group of one or more surfactant species which are included in the spacer fluid. For example, a surfactant package may include a single chemical species, or may alternatively include more than one chemical species.

Spacer fluids have the greatest mud removal efficiency in a wellbore when they have similar rheological properties to the drilling mud being circulated in the wellbore and the density of the spacer fluid is 5% to 20% greater than the density of the drilling mud. As will be described subsequently in greater detail, fluids are considered to have similar rheological properties when they have similar yield points (YPs) and plastic viscosities (PVs). Mud removal efficiency describes the extent to which a given spacer fluid is capable of displacing a given drilling mud. Mud removal efficiency can be quantitatively measured with a grid test.

The rheology of spacer fluids of the present disclosure and aqueous drilling muds can be described by the Bingham plastic model. The Bingham plastic model assumes a linear relationship between the shear stress and the shear rate of a fluid. Fluids that exhibit Bingham plastic behavior do not flow until the shear stress exceeds the yield point (YP) of the fluid. Once the yield point is reached, changes in shear stress and shear rate are proportional. The constant of this proportionality is known as the plastic viscosity (PV).

The yield point and density of a drilling mud are related to the ability of the drilling mud to remove formation cuttings from the wellbore. Spacer fluids of the present disclosure are formulated to be compatible with the rheology and density of such drilling muds. The rheological behavior of a drilling mud or spacer fluid can be determined by measuring the shear stress on the fluid at different shear rates. This may be accomplished by measuring the shear stress on the fluid using a FANN Model 35 viscometer operated at 0.05 Hz (3 RPM), 0.1 Hz (6 RPM), 1.67 Hz (100 RPM), 3.33 Hz (200 RPM), 5 Hz (300 RPM), and 10 Hz (600 RPM).

The plastic viscosity of a fluid is related to the resistance of that fluid to flow due to mechanical interactions between the components of the fluid. The plastic viscosity of a fluid may be calculated by measuring the shear stress of the fluid using a viscometer at shear rates of 5 Hz (300 RPM) and 10 Hz (600 RPM) and subtracting the 5 Hz viscosity from the 10 Hz viscosity as shown in Eq. (1).

$$PV=(\text{viscosity at 10 Hz})-(\text{viscosity at 5 Hz}) \qquad \text{Eq. (1)}$$

High shear rates are chosen for this calculation because the viscosity of Bingham plastic fluids exhibit more linear behavior at higher shear rates.

The yield point (YP) represents the minimum shear stress required to make a fluid flow. If a fluid is subjected to a shear stress less than the fluid's yield point, then the fluid will behave as a rigid body. If a fluid is subjected to a shear stress at or greater than the fluid's yield point, then the fluid will flow. The yield point is representative of a fluid's carrying capacity. A fluid with a greater yield point will be able to carry more mass. A drilling mud with a greater yield point can carry a greater mass of formation cuttings. A spacer fluid with a greater yield point can displace a greater mass of drilling mud. The yield point of a drilling mud can be tailored for specific situations or specific types of formation cutting removal by altering the composition of the mud. Spacer fluids can be designed to have yield points similar to the drilling mud by including additives that modify the rheology of the spacer fluid.

The yield point of a fluid is determined by extrapolating the Bingham plastic rheology model to a shear rate of zero according to American Petroleum Institute Recommended Practice 13B-1, incorporated by reference into this disclosure in its entirety. The yield point of a fluid can be calculated from rheological data and the plastic viscosity according to Eq. (2).

$$YP=(\text{viscosity at 5 Hz})-PV \qquad \text{Eq. (2)}$$

The yield point is expressed as a force per area, such as pounds of force per one hundred square feet (lbf/100 ft$^2$) or newtons per square meter (N/m$^2$). One pound of force per one hundred square feet is equal to about 4788 newtons per square meter (1 lbf/100 ft$^2$=4788 N/m$^2$).

In some embodiments, the spacer fluid may have a yield point from 10 lbf/100 ft$^2$ to 50 lbf/100 ft$^2$. In other embodiments, the spacer fluid may have a yield point from 10 lbf/100 ft$^2$ to 40 lbf/100 ft$^2$, from 10 lbf/100 ft$^2$ to 30 lbf/100 ft$^2$, from 10 lbf/100 ft$^2$ to 25 lbf/100 ft$^2$, from 10 lbf/100 ft$^2$ to 20 lbf/100 ft$^2$, from 10 lbf/100 ft$^2$ to 15 lbf/100 ft$^2$, from 15 lbf/100 ft$^2$ to 50 lbf/100 ft$^2$, from 15 lbf/100 ft$^2$ to 40 lbf/100 ft$^2$, from 15 lbf/100 ft$^2$ to 30 lbf/100 ft$^2$, from 15 lbf/100 ft$^2$ to 25 lbf/100 ft$^2$, from 15 lbf/100 ft$^2$ to 20 lbf/100 ft$^2$, from 15 lbf/100 ft$^2$ to 18 lbf/100 ft$^2$, from 18 lbf/100 ft$^2$ to 25 lbf/100 ft$^2$, or from 18 lbf/100 ft$^2$ to 20 lbf/100 ft$^2$.

In some embodiments, the spacer fluid may have a density from 62.5 pounds per cubic feet (pcf) to 160 pcf (where 1 pcf=16.0185 kg/m$^3$). In other embodiments, the spacer fluid may have a density from 62.5 pcf to 140 pcf; from 62.5 pcf to 120 pcf; from 62.5 pcf to 100 pcf; from 65.0 pcf to 160 pcf; from 65.0 pcf to 140 pcf; from 65.0 pcf to 120.0 pcf; from 65.0 pcf to 100.0 pcf; from 68.5 pcf to 160 pcf; from 68.5 pcf to 140 pcf; from 68.5 pcf to 120.0 pcf; from 68.5 pcf to 100.0 pcf; from 72.0 pcf to 160 pcf; from 72.0 pcf to 140 pcf; from 72.0 pcf to 120.0 pcf; from 72.0 pcf to 100.0 pcf; from 75.0 pcf to 160 pcf; from 75.0 pcf to 140 pcf; from 75.0 pcf to 120.0 pcf; or from 75.0 pcf to 100.0 pcf.

The spacer fluids of the present disclosure comprise an emulsion having an aqueous external phase and a hydrocarbon-based internal phase. The aqueous external phase may by any suitable fluid such as water or a solution containing both water and one or more organic or inorganic compounds dissolved in the water or otherwise completely miscible with the water. The aqueous external phase may comprise purified water, mineral water, brine water, fresh water, distilled water, sea water, salt water, other aqueous solutions, or combinations thereof. In embodiments, the aqueous external phase may comprise brine, including natural and synthetic brine. The aqueous external phase may include water containing water-soluble organic compounds, such as alcohols, organic acids, amines, aldehydes, ketones, esters, or other polar organic compounds, such as alcohols, organic acids, amines, aldehydes, ketones, esters, or other polar organic compounds or salts dissolved in the water.

The internal phase may be any suitable fluid such as oil or a solution containing both oil and one or more organic or inorganic compounds dissolved in the oil or otherwise completely miscible with the oil. The internal phase may comprise safra oil, diesel, mineral oil, paraffin oil, ben oil, marula oil, castor oil, palm oil, copra oil, jojoba oil, tung oil, other oils naturally derived from plants or animals, or combinations thereof. Without being limited by theory, it is believed that the internal phase may be statistically evenly dispersed within the external phase.

In one or more embodiments the spacer fluid comprises from 140 pounds to 315 pounds of aqueous external phase per barrel of spacer fluid. In other embodiments, the spacer fluid comprises from 160 pounds to 300 pounds, 180 pounds to 300 pounds, 200 pounds to 300 pounds, 220 pounds to 300 pounds, 140 pounds to 280 pounds, 160 pounds to 280 pounds, 180 pounds to 280 pounds, 200 pounds to 280 pounds, or 220 pounds to 280 pounds of aqueous external phase per barrel of spacer fluid.

In one or more embodiments the spacer fluid comprises from 5 pounds to 60 pounds of hydrocarbon-based internal phase per barrel of spacer fluid. In other embodiments, the spacer fluid comprises from 10 pounds to 50 pounds, 15 pounds to 40 pounds, 15 pounds to 30 pounds, or 20 pounds to 30 pounds of hydrocarbon-based internal phase per barrel of spacer fluid.

The spacer fluids of the present disclosure further comprise a surfactant package comprising one or more surfactants. The surfactant package may comprise an ethoxylated alcohol surfactant according to Formula (I):

$$R-(OC_2H_4)_9-OH \quad (I)$$

where R is a hydrocarbyl having from 12 to 14 carbon atoms. In some embodiments, R can be a saturated, unsaturated, linear, branched, or aromatic hydrocarbyl such as, by way of non-limiting examples, —C$_{12}$H$_{25}$ or —(CH$_2$)$_5$CH(CH$_3$)CH$_2$CH$_2$CH(CH$_3$)$_2$. In embodiments, R may be a saturated or unsaturated hydrocarbyl, such as a saturated alkyl (—C$_y$H$_{2y+1}$ where y is from 12 to 14), unsaturated alkyl (—C$_y$H$_{(2y-2z-4w+1)}$ where y is from 12 to 14, z is the number of double bonds in R, and w is the number of triple bonds in R), alkenyl (—CH=CHC$_y$H$_{(2y-2z-4w+1)}$ where y is from 10 to 12, z is a number of additional double bonds in R, and w is the number of triple bonds in R), alkynyl (—C≡CC$_y$H$_{(2y-2z-4w+1)}$ where y is from 10 to 12, z is the number of double bonds in R, and w is the number of additional triple bonds in R). Each of the general formulas for saturated alkyl, unsaturated alkyl, alkenyl, and alkynyl includes both linear groups and branched groups having 1, 2, 3, 4, 5, or greater than 5 branches at individual carbon atoms. Examples of linear hydrocarbyl groups include, without limitation, linear alkyls of formula —(CH$_2$)$_y$CH$_3$ where y is from 11 to 13 and linear alkenyls of formula —CH=(CH$_2$)$_y$CH$_3$ where y is an integer from 10 to 12. Specific examples of linear alkyls include n-decyl, n-undecyl, and n-dodecyl. In embodiments, R can be a saturated, unsaturated, linear, branched, or aromatic hydrocarbyl having from 12 to 13 carbon atoms, from 13 to 14 carbon atoms, exactly 12 carbon atoms, exactly 13 carbon atoms, or exactly 14 carbon atoms.

In one embodiment the spacer fluid may comprise from 0.40 pounds to 21 pounds of surfactant package per barrel of spacer fluid. In other embodiments, the spacer fluid may comprise from 1 pound to 18 pounds, from 3 pounds to 15 pounds, from 4 pounds to 12 pounds, or from 5 pounds to 10 pounds of surfactant package per barrel of spacer fluid.

The ethoxylated alcohol surfactant may be the condensation product of an ethoxylation reaction of a fatty alcohol. The fatty alcohol is an alcohol having a formula R—OH, where R is a saturated or unsaturated, linear, or branched hydrocarbyl. In some embodiments, R has from 12 to 14 carbon atoms. In other embodiments, R may have exactly 12 carbon atoms, exactly 13 carbon atoms, or exactly 14 carbon atoms. In one or more embodiments, R may be a saturated linear hydrocarbyl. In other embodiments, R may be an unsaturated linear hydrocarbyl. Still, in other embodiments, R is a branched hydrocarbyl.

In some embodiments, the fatty alcohol may be a naturally occurring fatty alcohol, such as a fatty alcohol obtained from natural sources such as animal products or vegetable oils. Non-limiting examples of naturally occurring fatty alcohols include, but are not limited to, capric alcohol, decyl alcohol, lauryl alcohol, myristyl alcohol, cetyl alcohol, stearyl alcohol, palmitoeyl alcohol, heptadecanol, nonadecyl alcohol, arachidyl alcohol, other naturally-occuring fatty alcohols, other synthetic alcohols, or combinations thereof.

In some embodiments, the fatty alcohol may be a synthetic fatty alcohol prepared from a synthesis reaction using one or more petroleum based precursors. For example, one embodiment may use the oligomerization of ethylene to produce a fatty alcohol having a formula R—OH where R is a saturated or unsaturated, linear, or branched hydrocarbyl. In some embodiments, R has from 12 to 14 carbon atoms. In other embodiments, R may have exactly 12 carbon atoms, exactly 13 carbon atoms, or exactly 14 carbon atoms.

The ethoxylation of a fatty alcohol, R—OH to form the ethoxylated alcohol surfactant proceeds according to Equation 3:

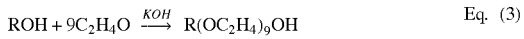

$$ROH + 9C_2H_4O \xrightarrow{KOH} R(OC_2H_4)_9OH \quad \text{Eq. (3)}$$

where the fatty alcohol is reacted with ethylene oxide in a 1:9 molar ratio yielding a relative mole of reaction product. As shown in Equation 3, the reaction product is an ethoxylated fatty alcohol according to Formula (I). As should be appreciated, the degree of ethoxylation may vary from molecule to molecule by a standardized distribution, where some molecules include fewer than the desired number of ethoxy groups and some molecules include more than the desired number of ethoxy groups.

The ethoxylated alcohol surfactant of the surfactant package may have a hydrophilic-lipophilic balance (HLB) value from 11 to 14. The HLB value of a molecule is a measure of the degree to which it is hydrophilic or lipophilic. HLB value is calculated by the Griffin Method according to Equation 4:

$$HLB = 20 * \frac{M_h}{M} \quad \text{Eq. (4)}$$

where $M_h$ is the molecular mass of the hydrophilic portion of the molecule and M is the molecular mass of the whole molecule. HLB values calculated using Equation 4 range from 0 to 20 in which a value of 0 indicates an absolutely hydrophobic/lipophilic molecule and a value of 20 corresponds to an absolutely hydrophilic/lipophobic molecule. Generally, molecules having an HLB less than 10 are lipid soluble, molecules having an HLB greater than 10 are water soluble, and molecules with an HLB between 3 and 16 have some surfactant/emulsifying properties.

In some embodiments, the ethoxylated alcohol surfactant of the surfactant package has an HLB value from 11 to 15. In other embodiments, the surfactant package has an HLB value from 12 to 15, from 13 to 15, from 12 to 14, from 13 to 14, from 11 to 12, or from 11 to 13.

The spacer fluids of the present disclosure may further comprise at least one additive that modifies the rheology of the spacer fluid, the density of the spacer fluid, or both. In the context of the present disclosure, an additive is a component that is not part of the aqueous external phase, the hydrocarbon-based internal phase, or the surfactant package. In some embodiments, the additive may comprise a viscosifier to comport the spacer fluid to the rheology of a particular drilling mud. In other embodiments, this additive may comprise a particulate solid having a specific gravity sufficient to increase the density of the spacer fluid without adversely affecting the flowability or other rheological properties of the spacer fluid.

Examples of additives include, but are not limited to, polysaccharides, polyacrylamides, minerals, defoaming agents, xanthan gum polymer, $BaSO_4$, $Fe_2O_3$, $FeCO_3$, $CaCO_3$, $FeO.TiO_2$, bentonite, polyanionic cellulose, or combinations thereof.

In some embodiments the spacer fluid may comprise from 0.3 pounds to 750 pounds of one or more additives per barrel of spacer fluid. In other embodiments, the spacer fluid may comprise from 10 pounds to 700 pounds, from 15 pounds to 650 pounds, from 20 pounds to 600 pounds, from 25 pounds to 500 pounds, from 30 pounds to 400 pounds, from 40 pounds to 350 pounds, from 50 pounds to 300 pounds, from 60 pounds to 275 pounds, from 70 pounds to 250 pounds, from 90 pounds to 230 pounds, from 110 pounds to 210 pounds, or from 130 pounds to 190 pounds of one or more additives per barrel of spacer fluid.

Other embodiments of the present application relate to methods for removing aqueous based drilling muds from a wellbore. The method may comprise passing a spacer fluid through the wellbore. The passing spacer fluid may be directed through the annulus and out the outlet of the wellbore. The spacer fluid may then direct the aqueous mud in the wellbore to flow through the annulus and out the outlet of the wellbore.

As previously described, drilling muds can carry formations cuttings out the outlet of the wellbore. Similarly, spacer fluids can direct or displace drilling muds out the outlet of the wellbore. Spacer fluids are most efficient at displacing drilling muds when the spacer fluid and drilling mud have similar rheology and the density of the spacer fluid is 5% to 20% greater than the density of the drilling mud.

The spacer fluids of the present disclosure formulated to be compatible with certain aqueous drilling muds. In some embodiments, the aqueous drilling mud that is compatible with spacer fluids of the present disclosure comprises from 30 pounds to 351 pounds of water per barrel of aqueous drilling mud. In other embodiments, the aqueous drilling mud that is compatible with spacer fluids of the present disclosure comprises from 225 pounds to 340 pounds, from 245 pounds to 330 pounds, from 265 pounds to 325 pounds, or from 285 pounds to 315 pounds of water per barrel of aqueous drilling mud.

Other embodiments of the present application relate to a wellbore fluid system comprising an aqueous mud and a spacer fluid. The aqueous mud may be any kind of aqueous drilling mud known or conventionally used in wellbore operations. The spacer fluid may comprise an emulsion, a surfactant package comprising one or more surfactants in the emulsion, and at least one additive. The emulsion may comprise an aqueous external phase and a hydrocarbon-based internal phase. The surfactant package may comprise an ethoxylated alcohol surfactant according to formula (I) where R is a hydrocarbyl having from 12 to 14 carbon atoms. The ethoxylated alcohol surfactant of the surfactant package may have an HLB value from 11 to 15. The spacer fluid additive or additives may modify the viscosity of the spacer fluid, the density of the spacer fluid, or both. In some embodiments of the wellbore fluid system, the density of the spacer fluid is 5% to 20% greater than the density of the aqueous mud. In some embodiments of the wellbore fluid system, the difference between the yield point of the aqueous mud and the yield point of the spacer fluid may be less than 15 lbs/100 ft². The spacer fluid may have a yield point greater than that of the aqueous mud, a yield point less than that of the aqueous mud, or a yield point equal to that of the aqueous mud.

As previously described, spacer fluids have the greatest mud removal efficiency when they have a density from 5% to 20% greater than that of the mud the spacer fluid is displacing and similar rheological properties to that of the mud the spacer fluid is displacing. In other embodiment, a spacer fluid has the greatest removal efficiency when it has a density from 5% to 15% or from 10% to 15% greater than that of the mud the spacer fluid is displacing.

In at least one embodiment, two fluids have similar rheological properties if the difference between their yield points, as measured by American Petroleum Institute Recommended Practice 13B-1, is less than or equal to 15 lbs/100 ft$^2$. In other embodiments, two fluids have similar rheological properties if the difference between their yield points, as measured by American Petroleum Institute Recommended Practice 13B-1, is less than or equal to 12 lbf/100 ft$^2$, less than or equal to 10 lbf/100 ft$^2$, less than or equal to 5 lbf/100 ft$^2$, less than or equal to 4 lbf/100 ft$^2$, less than or equal to 3 lbf/100 ft$^2$, less than or equal to 2 lbf/100 ft$^2$, less than or equal to 1.5 lbf/100 ft$^2$, or less than or equal to 1 lbf/100 ft$^2$.

EXAMPLES

Example spacer fluid compositions were prepared to illustrate one or more additional features of the present disclosure. It should be understood that these examples are not intended to limit the scope of the disclosure or the appended claims in any manner.

Two example spacer fluids according to embodiments of the present disclosure were prepared that included a surfactant package, 51, comprising at least one alcohol ethoxylated surfactant (AES) according to the general formula R—(OC$_2$H$_4$)$_9$—OH, where R is a hydrocarbyl having from 12 to 14 carbon atoms. S1 was prepared by ethoxylating a mixture of isolated naturally occurring C$_{12}$-C$_{14}$ fatty acids with nine moles of ethylene oxide. The example spacer fluids were Spacer Fluid 1 and Spacer Fluid 2. Spacer Fluid 1 was prepared by adding water, diesel, and tuned spacer E+(a commercially available viscosifier from the Halliburton Company) to a multimixer and mixing for 10 minutes. Next, D-Air-3000L (a commercially available defoaming agent from The Halliburton Company) was added to the multimixer and mixed for 5 minutes. Then, the surfactant package, S1, was added to the multimixer and mixed for 5 minutes. Finally, BaSO$_4$ was added to the multimixer and mixed for 5 minutes.

Spacer Fluid 2 was prepared by adding to a multimixer amounts of water, safra oil, and tuned spacer E+(a commercially available viscosifier from the Halliburton Company) and mixing for 10 minutes. Next, D-Air-3000L (a commercially available defoaming agent from The Halliburton Company) was added to the multimixer and mixed for 5 minutes. Then, the surfactant package, 51, was added to the multimixer and mixed for 5 minutes. Finally, BaSO$_4$ was added to the multimixer and mixed for 5 minutes.

As bases for comparing mud removal efficiency of spacer fluids of the present disclosure to contemporary spacer fluids, Comparative Fluids A-E were made. Comparative Fluid A contained no hydrocarbon-based internal phase and no surfactant. Comparative Fluid B included a hydrocarbon-based internal phase comprising diesel and no surfactant. Comparative Fluid C included a hydrocarbon-based internal phase comprising diesel and a synthetic AES-type surfactant, C$_{10}$H$_{21}$(OC$_2$H$_4$)$_7$OH. Comparative Fluid D included a hydrocarbon-based internal phase comprising diesel and a surfactant package. The surfactant package of Comparative Fluid D was an AES-type surfactant, namely a mixture of naturally derived fatty alcohols ethoxylated with one mole of ethylene oxide that have the general formula R—(OC$_2$H$_4$)—OH, where R is a hydrocarbyl having from 12 to 14 carbon atoms. Comparative Fluid E included a hydrocarbon-based internal phase comprising diesel and LoSurf-259, a commercially available surfactant from The Halliburton Company. The compositions of Spacer Fluid 1, Spacer Fluid 2, and Comparative Fluids A-E are summarized in Table 1.

TABLE 1

|  | Spacer Fluid 1 | Spacer Fluid 2 | Comp. Fluid A | Comp. Fluid B | Comp. Fluid C | Comp. Fluid D | Comp. Fluid E |
|---|---|---|---|---|---|---|---|
| Surfactant Type | AES | AES | None | None | AES | AES | LoSurf-259** |
| Carbon atoms in R | 12-14 | 12-14 | — | — | 10 | 12-14 | N/A |
| Ethoxylate ratio x | 9 | 9 | — | — | 7 | 1 | N/A |
| Component | Concentration (lb/bbl) | | | | | | |
| Water | 269.18 | 269.18 | 300.31 | 276.64 | 269.16 | 268.96 | 269.00 |
| Diesel | 24.88 | 0.00 | 0.00 | 25.57 | 24.88 | 24.86 | 24.87 |
| Safra | 0.00 | 24.88 | 0.00 | 0.00 | 0.00 | 0.00 | 0.00 |
| E+ | 11.00 | 11.00 | 11.00 | 11.00 | 11.00 | 11.00 | 11.00 |
| D-Air | 0.39 | 0.39 | 0.39 | 0.39 | 0.39 | 0.39 | 0.39 |
| Surfactant | 8.33 | 8.33 | 0.00 | 0.00 | 8.25 | 7.54 | 7.67 |
| BaSO$_4$ | 130.3 | 130.3 | 132.39 | 130.48 | 130.41 | 131.33 | 131.17 |

* AES = an alcohol ethoxylated surfactant of the general formula R—(OC$_2$H$_4$)$_x$—OH, where R is a hydrocarbyl having the number of carbon atoms specified and x is the specified molar ratio of ethoxylate to hydrocarbyl in the surfactant.
**Losurf-259 is a proprietary surfactant composition commercially available from Halliburton Company.

A grid test may be performed to assess the mud removal efficiencies of the various spacer fluids. As part of the grid test, a grid is coated with a mud and then various spacer fluids are tested to determine how efficiently the spacer fluids remove the mud. In preparation for the grid tests, an example aqueous mud may be prepared for assessing the mud removal efficiencies of various spacer fluids. An example mud is prepared by adding water and bentonite into a multimixer. These two components are mixed for 20 minutes and then left to rest for 4 to 16 hours. Then, XC polymer is added to the multimixer and mixed for 10 minutes. Next, potato starch is added to the multimixer and mixed for 5 minutes. Then, polyanionic cellulose is added to the multimixer and mixed for 5 minutes. Next, potassium chloride is added to the multimixer and mixed for 5 minutes. Then, sodium hydroxide is added to the multimixer and mixed for 5 minutes. Next, calcium carbonate is added to the multimixer and mixed for 5 minutes. Finally, $BaSO_4$ is added to the multimixer and mixed for 5 minutes.

An Example Aqueous Mud was prepared according to the previously described method having ingredients in the amounts summarized in Table 2. Subsequently, grid tests were performed for assessing the mud removal efficiencies of Spacer Fluids 1 and 2 and comparing the mud removal efficiencies of Spacer Fluids 1 and 2 with those of Comparative Fluids A-E.

(300 rpm). Following Equation 2, as provided in the Detailed Description, the yield point (YP) of each fluid was calculated as the difference of the viscosity at 5 Hz (300 rpm) and the plastic viscosity (PV). As described previously, spacer fluids have the greatest mud removal efficiency when they have similar rheological characteristics of the mud the spacer fluid is displacing. Individual rheology measurements, PV, YP, and the density of each fluid are detailed in Table 3.

TABLE 3

| Property | | Spacer Fluid 1 | Spacer Fluid 2 | Comp. Fluid A | Comp. Fluid B | Comp. Fluid C | Comp. Fluid D | Comp. Fluid E | Example Aq. Mud |
|---|---|---|---|---|---|---|---|---|---|
| Viscosity | 600 rpm | 40 | 40 | 66 | 66 | 72 | 46 | 76 | 35 |
| (cP) | 300 rpm | 28 | 28 | 45 | 45 | 53 | 29 | 62 | 26 |
| | 200 rpm | 22 | 22 | 38 | 38 | 45 | 24 | 59 | 21 |
| | 100 rpm | 16 | 16 | 29 | 29 | 34 | 18 | 53 | 14 |
| | 6 rpm | 6 | 6 | 14 | 14 | 17 | 8 | 30 | 4 |
| | 3 rpm | 5 | 5 | 12 | 12 | 15 | 6 | 21 | 2 |
| PV (cP) | | 12 | 12 | 21 | 21 | 19 | 17 | 14 | 9 |
| YP (lbs/100 ft$^2$) | | 16 | 16 | 24 | 24 | 34 | 12 | 48 | 17 |
| Density (pcf) | | 79.2 | 79.2 | 79.2 | 79.2 | 79.2 | 79.2 | 79.2 | 72 |

TABLE 2

Example Aqueous Mud

| Component | Pounds per Barrel (lb/bbl) |
|---|---|
| water | 311.63 |
| hydrated bentonite | 5.00 |
| XC polymer | 1.00 |
| potato starch | 5.00 |
| polyanionic cellulose | 1.00 |
| KCl | 32.11 |
| NaOH | 0.25 |
| CaCO$_3$ | 15.00 |
| BaSO$_4$ | 29.48 |

As described previously, spacer fluids have the greatest mud removal efficiency when they have a density that is from 5% to 20% greater than that of the mud the spacer fluid is displacing. For this reason, Spacer Fluids 1-2 and Comparative Fluids A-E were formulated to have a density 10% greater than the example mud. Spacer Fluids 1-2 differ from Comparative Fluids A-E in that they comprise different surfactant packages. The surfactant packages of the fluids of the present disclosure, in addition to their role as surfactants, may uniquely modify the rheology of the fluid in such a way to have similar rheological characteristics to the example mud.

The viscosities of Spacer Fluids 1-2, Comparative Fluids A-E, and the Example Aqueous Mud were measured at shear rates of 10 Hz (600 rpm), 5 Hz (300 rpm), 3.33 Hz (200 rpm), 1.67 Hz (100 rpm), 0.1 Hz (6 rpm), and 0.05 Hz (3 rpm) using a FANN Model 35 viscometer. Following Equation 1, as provided in the Detailed Description, the plastic viscosity (PV) of each fluid was calculated as the difference of the viscosity at 10 Hz (600 rpm) and the viscosity at 5 Hz As shown in Table 3, Spacer Fluid 1 and 2 as well as Comparative Examples A-E all had a density 10% greater than that of the Example Aqueous Mud. However, Spacer Fluid 1 and 2 have YP closer to the Example Aqueous Mud than any Comparative Example. As explained previously, this correlates to a greater mud removal efficiency for Spacer Fluids 1 and 2 as compared to Comparative Examples A-E.

A grid test was performed to measure the mud removal efficiency of Spacer Fluids 1-2 and Comparative Fluids A-E. In each grid test, a FANN Model 35 viscometer's rotor was fitted with a grid and immersed in the Example Aqueous Mud of Table 3 for 10 minutes and allowed to drip dry for 2 minutes. The mud coated grid was then weighed to establish a starting weight. The grid was then placed in a viscometer cup preheated to 140° F. and immersed in the sample spacer fluid. The rotor was then rotated for 5 minutes at 1.67 Hz (100 rpm), removed from the viscometer cup, and allowed to drip dry for 2 minutes. After dripping, the grid was weighed and the percent difference in weight from the starting weight was calculated. The percent difference in weight, expressed as a negative number to reflect a decrease of the grid's weight, is also known as the raw mud removal efficiency. This process was repeated at rotation time intervals of 10 minutes, 15 minutes, 20 minutes, and 30 minutes to yield mud removal efficiencies for each time interval. The raw mud removal efficiencies for each of the samples, at all recorded time intervals are presented in Table 4.

TABLE 4

| | Raw Mud Removal Efficiency | | | | | |
| | Grid Test Rotation Time (min) | | | | | |
| Sample | 5 | 10 | 15 | 20 | 30 | Average |
|---|---|---|---|---|---|---|
| Spacer Fluid 1 | −23% | −18% | −15% | −23% | −30% | −22% |
| Spacer Fluid 2 | −19% | −33% | −48% | −57% | −55% | −42% |
| Comparative Example A | −139% | −145% | −109% | −94% | −88% | −115% |
| Comparative Example B | −170% | −209% | −192% | −189% | −178% | −188% |
| Comparative Example C | −167% | −189% | −205% | −193% | −211% | −193% |
| Comparative Example D | −344% | −403% | −384% | −389% | −396% | −383% |
| Comparative Example E | −131% | −167% | −158% | −174% | −155% | −157% |

Each raw mud removal efficiency was normalized on a 0-100 scale based on the maximum and minimum mud removal efficiencies across all fluids. The normalized efficiencies are reported in Table 5. The maximum mud removal efficiency, $E_{100}$, was Spacer Fluid 2 at a 15 minute time interval. The minimum mud removal efficiency, $E_0$, was Comparative Example C at a 10 minute time interval. Each normalized data point in Table 4 was determined by subtracting $E_0$ from the raw mud removal efficiency, dividing that result by $E_{100}$, and multiplying that result by 100. On this normalized scale, 100 represents the greatest mud removal efficiency and 0 represents the least mud removal efficiency. The normalization procedure takes into account that some components of the spacer fluids (for example, $BaSO_4$) stick to the rotor, which can affect the weight measurements. An average mud removal efficiency was calculated for each fluid based on the arithmetic average of the normalized mud removal efficiencies of time intervals 5 minutes, 10 minutes, 15 minutes, 20 minutes, and 30 minutes.

TABLE 5

| | Normalized Mud Removal Efficiency | | | | | |
| | Grid Test Rotation Time (min) | | | | | |
| Sample | 5 | 10 | 15 | 20 | 30 | Average |
|---|---|---|---|---|---|---|
| Spacer Fluid 1 | 98 | 99 | 100 | 98 | 96 | 98 |
| Spacer Fluid 2 | 99 | 95 | 92 | 89 | 90 | 93 |
| Comparative Example A | 68 | 67 | 76 | 80 | 81 | 74 |
| Comparative Example B | 60 | 50 | 55 | 55 | 58 | 56 |
| Comparative Example C | 61 | 55 | 51 | 54 | 50 | 54 |
| Comparative Example D | 15 | 0 | 5 | 4 | 2 | 5 |
| Comparative Example E | 70 | 61 | 63 | 59 | 64 | 63 |

As shown in Table 5, both of Spacer Fluids 1 and 2 exhibited greater normalized mud removal efficiency than that of any of the Comparative Examples A-E. Spacer Fluids 1 and 2 exhibited average normalized mud removal efficiencies greater than 90. The Comparative Fluid with the greatest normalized mud removal efficiency, Comparative Example A, had a greatest normalized mud removal efficiency of only 81 (at 30 minutes) and an average mud removal efficiency of 74 over all measured time intervals.

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

A first aspect of the disclosure is directed to a spacer fluid comprising: an emulsion comprising an aqueous external phase and a hydrocarbon-based internal phase; a surfactant package comprising one or more surfactants, where the surfactant package comprises a surfactant having the chemical structure R—$(OC_2H_4)_9$—OH, where R is a hydrocarbyl having 12 carbon atoms, and where the surfactant is present in a concentration of at least 4.25 pounds per barrel of spacer fluid; and at least one additive that modifies the rheology of the spacer fluid, the density of the spacer fluid, or both.

A second aspect of the disclosure includes the first aspect, a spacer fluid comprising: an emulsion comprising an aqueous external phase and a hydrocarbon-based internal phase; a surfactant package comprising one or more surfactants, where the surfactant package comprises a surfactant having the chemical structure R—$(OC_2H_4)_9$—OH, where R is a hydrocarbyl having 13 carbon atoms; and at least one additive that modifies the rheology of the spacer fluid, the density of the spacer fluid, or both.

A third aspect of the disclosure includes the first or second aspects, A spacer fluid comprising: an emulsion comprising an aqueous external phase and a hydrocarbon-based internal phase; a surfactant package comprising one or more surfactants, where the surfactant package comprises a surfactant having the chemical structure R—$(OC_2H_4)_9$—OH, where R is a hydrocarbyl having 14 carbon atoms; and at least one additive that modifies the rheology of the spacer fluid, the density of the spacer fluid, or both.

A fourth aspect of the disclosure includes any of the first through third aspects, in which the surfactant package has a hydrophilic-lipophilic balance value from 13 to 15.

A fifth aspect of the disclosure includes any of the first through third aspects, in which the spacer fluid has a yield point from 10 lbf/100 ft² to 50 lbf/100 ft² as measured by American Petroleum Institute Recommended Practice 13B-1.

A sixth aspect of the disclosure includes any of the first through third aspects, in which the spacer fluid has a yield point from 10 lbf/100 ft² and 25 lbf/100 ft² as measured by American Petroleum Institute Recommended Practice 13B-1.

A seventh aspect of the disclosure includes any of the first through third aspects, in which the spacer fluid has a density from 62.5 pcf to 160 pcf.

An eighth aspect of the disclosure includes any of the first through third aspects, in which the spacer fluid has a density from 72.0 pcf to 87.5 pcf.

A ninth aspect of the disclosure includes any of the first through third aspects, in which the hydrocarbon-based internal phase comprises one or more of safra oil, diesel, mineral oil, paraffin oil, ben oil, marula oil, castor oil, palm oil, copra oil, jojoba oil, tung oil, or other oils naturally derived from plants or animals.

A tenth aspect of the disclosure includes any of the first through third aspects, in which the at least one additive comprises one or more of polysaccharides, polyacrylamides, minerals, defoaming agents, $BaSO_4$, $CaCO_3$, $Fe_2O_3$, $FeCO_3$, FeTiO, bentonite, xanthan gum polymer, polyanionic cellulose.

An eleventh aspect of the disclosure includes any of the first through third aspects, in which the spacer fluid comprises from 140 pounds to 300 pounds of aqueous external phase per barrel of spacer fluid.

A twelfth aspect of the disclosure includes any of the first through third aspects, in which the spacer fluid comprises from 0.40 pounds to 21 pounds of surfactant package per barrel of spacer fluid.

A thirteenth aspect of the disclosure is directed to A method of removing aqueous muds from a wellbore, the method comprising: adding a spacer fluid according to any of the preceding claims to a wellbore comprising an aqueous mud, the spacer fluid comprising:

an emulsion comprising an aqueous external phase and a hydrocarbon-based internal phase;

a surfactant package comprising one or more surfactants, where the surfactant package comprises a surfactant having the chemical structure R—$(OC_2H_4)_9$—OH, where:

R is a hydrocarbyl having from 12 to 14 carbon atoms and the surfactant has a hydrophilic-lipophilic balance from 11 to 15; and at least one additive that modifies the rheology of the spacer fluid, the density of the spacer fluid, or both; passing the spacer fluid through the wellbore, where at least a portion of the aqueous mud exits the wellbore through a conduit defined by an exterior wall of the tubular and a wall of the wellbore.

A fourteenth aspect of the disclosure includes the thirteenth aspect, in which the spacer fluid has a yield point from 10 lbf/100 ft² to 50 lbf/100 ft² as measured by American Petroleum Institute Recommended Practice 13B-1

A fifteenth aspect of the disclosure includes the thirteenth and fourteenth aspects, in which the spacer fluid has a yield point from 10 lbf/100 ft² to 25 lbf/100 ft² as measured by American Petroleum Institute Recommended Practice 13B-1.

A sixteenth aspect of the disclosure includes any of the thirteenth through fifteenth aspects, in which the hydrocarbon-based internal phase comprises one or more of safra oil, diesel, mineral oil, paraffin oil, ben oil, marula oil, castor oil, palm oil, copra oil, jojoba oil, tung oil, or other oils naturally derived from plants or animals.

A seventeenth aspect of the disclosure includes any of the thirteenth through sixteenth aspects, in which the spacer fluid comprises from 140 pounds to 300 pounds of aqueous external phase per barrel of spacer fluid.

An eighteenth aspect of the disclosure includes any of the thirteenth through seventeenth aspects, in which the spacer fluid comprises from 0.40 pounds to 21 pounds of surfactant package per barrel of spacer fluid.

A nineteenth aspect of the disclosure includes any of the thirteenth through eighteenth aspects, in which the at least one additive comprises one or more of polysaccharides, polyacrylamides, minerals, defoaming agents, $BaSO_4$, $CaCO_3$, $Fe_2O_3$, $FeCO_3$, FeTiO, bentonite, xanthan gum polymer, polyanionic cellulose.

A twentieth aspect of the disclosure includes any of the thirteenth through nineteenth aspects, in which the aqueous mud comprises from 30 pounds to 351 pounds of water per barrel of aqueous mud.

A twenty-first aspect of the disclosure includes any of the thirteenth through twentieth aspects, in which the aqueous mud comprises from 4 pounds to 420 pounds of alkali metal salt or alkali earth metal salt per barrel of aqueous mud.

A twenty-second aspect of the disclosure is directed to a wellbore fluid system comprising: an aqueous mud in a wellbore; and a spacer fluid in contact with the aqueous mud in the wellbore, the spacer fluid comprising: an emulsion comprising an aqueous external phase and a hydrocarbon-based internal phase; a surfactant package comprising one or more surfactants, where the surfactant package comprises a surfactant having the chemical structure R—$(OC_2H_4)_9$—OH, where: R is a hydrocarbyl having from 12 to 14 carbon atoms and the surfactant has a hydrophilic-lipophilic balance from 11 to 15; and at least one additive that modifies the rheology of the spacer fluid, the density of the spacer fluid, or both; in which: the density of the spacer fluid, as measured by American Petroleum Institute Recommended Practice 13B-1, is 5% to 20% greater than the density of the aqueous mud as measured by American Petroleum Institute Recommended Practice 13B-1; and the difference between the yield point of the aqueous mud, as measured by American Petroleum Institute Recommended Practice 13B-1, and the yield point of the spacer fluid, as measured by American Petroleum Institute Recommended Practice 13B-1, is less than or equal to 15 lbf/100 ft².

A twenty-third aspect of the disclosure includes the twenty-second aspect, in which the density of the spacer fluid is 10% to 20% greater than the density of the aqueous mud.

A twenty-fourth aspect of the disclosure includes the twenty-second and twenty-third aspects, in which the density of the spacer fluid is 10% to 15% greater than the density of the aqueous mud.

A twenty-fifth aspect of the disclosure includes any of the twenty-second aspect, in which the difference of the yield point of the aqueous mud and the yield point of the spacer fluid is less than or equal to 10 lbf/100 ft².

A twenty-sixth aspect of the disclosure includes any of the twenty-second through twenty-fifth aspects, in which the difference of the yield point of the aqueous mud and the yield point of the spacer fluid is less than or equal to 5 lbf/100 ft².

What is claimed is:
1. A wellbore fluid system comprising:
an aqueous mud in a wellbore; and
a spacer fluid in contact with the aqueous mud in the wellbore, the spacer fluid comprising:

an emulsion comprising an aqueous external phase and a hydrocarbon-based internal phase;

a surfactant package comprising:

one or more surfactants having the chemical structure $R(OC_2H_4)_9$—OH, where R is a hydrocarbyl having from 12 to 14 carbon atoms and the surfactant has a hydrophilic-lipophilic balance from 11 to 15; and at least one additive that modifies the rheology of the spacer fluid, the density of the spacer fluid, or both;

in which:

the density of the spacer fluid, as measured by American Petroleum Institute Recommended Practice 13B-1, is 5% to 20% greater than the density of the aqueous mud as measured by American Petroleum Institute Recommended Practice 13B-1; and the difference between the yield point of the aqueous mud, as measured by American Petroleum Institute Recommended Practice 13B-1, and the yield point of the spacer fluid, as measured by American Petroleum Institute Recommended Practice 13B-1, is less than or equal to 15 lbf/100 ft$^2$.

2. The wellbore fluid system of claim 1, in which the density of the spacer fluid is 10% to 20% greater than the density of the aqueous mud.

3. The wellbore fluid system of claim 1, in which the density of the spacer fluid is 10% to 15% greater than the density of the aqueous mud.

4. The wellbore fluid system of claim 1, in which the difference of the yield point of the aqueous mud and the yield point of the spacer fluid is less than or equal to 10 lbf/100 ft$^2$.

5. The wellbore fluid system of claim 1, in which the difference of the yield point of the aqueous mud and the yield point of the spacer fluid is less than or equal to 5 lbf/100 ft$^2$.

6. The wellbore fluid system of claim 1, in which the surfactant package has a hydrophilic-lipophilic balance value from 13 to 15.

7. The wellbore fluid system of claim 1, in which the spacer fluid has a yield point from 10 lbf/100 ft$^2$ to 50 lbf/100 ft$^2$ as measured by American Petroleum Institute Recommended Practice 13B-1.

8. The wellbore fluid system of claim 1, in which the spacer fluid has a yield point from 10 lbf/100 ft$^2$ and 25 lbf/100 ft$^2$ as measured by American Petroleum Institute Recommended Practice 13B-1.

9. The wellbore fluid system of claim 1, in which the spacer fluid has a density from 62.5 pcf to 160 pcf.

10. The wellbore fluid system of claim 1, in which the spacer fluid has a density from 72.0 pcf to 87.5 pcf.

11. The wellbore fluid system of claim 1, in which the hydrocarbon-based internal phase comprises one or more of safra oil, diesel, mineral oil, paraffin oil, ben oil, marula oil, castor oil, palm oil, copra oil, jojoba oil, tung oil, or other oils naturally derived from plants or animals.

12. The wellbore fluid system of claim 1, in which the spacer fluid comprises from 140 pounds to 300 pounds of aqueous external phase per barrel of spacer fluid.

13. The wellbore fluid system of claim 1, in which the spacer fluid comprises from 0.40 pounds to 21 pounds of surfactant package per barrel of spacer fluid.

14. The wellbore fluid system of claim 1, in which the at least one additive comprises one or more of polysaccharides, polyacrylamides, minerals, defoaming agents, $BaSO_4$, $CaCO_3$, $Fe_2O_3$, $FeCO_3$, FeTiO, bentonite, xanthan gum polymer, polyanionic cellulose.

* * * * *